(12) United States Patent
Geist

(10) Patent No.: US 12,487,631 B1
(45) Date of Patent: Dec. 2, 2025

(54) GRAY CODE COUNTER ENABLED TO INCREMENT BY GREATER THAN ONE

(71) Applicant: Synopsys, Inc., Sunnyvale, CA (US)

(72) Inventor: Alan Geist, Gladstone, OR (US)

(73) Assignee: Synopsys, Inc., Sunnyvale, CA (US)

(*) Notice: Subject to any disclaimer, the term of this patent is extended or adjusted under 35 U.S.C. 154(b) by 92 days.

(21) Appl. No.: 18/420,699

(22) Filed: Jan. 23, 2024

(51) Int. Cl.
  *G06F 1/12* (2006.01)
  *G06F 5/10* (2006.01)

(52) U.S. Cl.
  CPC .............. *G06F 1/12* (2013.01); *G06F 5/10* (2013.01); *G06F 2205/102* (2013.01)

(58) Field of Classification Search
  None
  See application file for complete search history.

(56) References Cited

U.S. PATENT DOCUMENTS

| | | | | |
|---|---|---|---|---|
| 5,088,061 A * | 2/1992 | Golnabi | G11C 7/22 | 365/78 |
| 6,161,160 A * | 12/2000 | Niu | H04L 12/40032 | 710/60 |
| 6,314,154 B1 * | 11/2001 | Pontius | H03K 23/005 | 377/16 |
| 6,337,893 B1 * | 1/2002 | Pontius | G06F 5/14 | 377/34 |
| 6,594,329 B1 * | 7/2003 | Susnow | H04L 7/005 | 375/372 |
| 6,801,143 B2 * | 10/2004 | Oberai | H03M 7/16 | 341/97 |
| 6,857,043 B1 * | 2/2005 | Lee | G06F 5/14 | 713/400 |
| 6,934,198 B1 * | 8/2005 | Lowe | G06F 5/14 | 710/52 |
| 6,937,172 B1 * | 8/2005 | Lowe | H03K 23/005 | 341/97 |
| 6,956,776 B1 * | 10/2005 | Lowe | G06F 5/14 | 365/189.12 |
| 7,003,059 B1 * | 2/2006 | Susnow | H04L 7/005 | 375/377 |
| 7,254,677 B1 * | 8/2007 | Lowe | G06F 5/10 | 710/52 |
| 8,417,982 B1 * | 4/2013 | Amit | G06F 5/12 | 713/400 |
| 8,631,265 B2 * | 1/2014 | Ono | G06F 5/12 | 713/400 |
| 2004/0001014 A1 * | 1/2004 | Oberai | H03M 7/16 | 341/98 |
| 2005/0024241 A1 * | 2/2005 | Oberai | H03M 7/16 | 341/98 |

(Continued)

OTHER PUBLICATIONS

Machine Translation of Chinese Patent Application CN-115952132-B, May 12, 2023. (Year: 2023).*

(Continued)

*Primary Examiner* — Steven G Snyder
(74) *Attorney, Agent, or Firm* — Andrew L. Dunlap; Haynes Beffel & Wolfeld LLP

(57) ABSTRACT

A Gray code counter is enabled to increment by greater than one and still obey a rule of only one bit of change. The Gray code counter has applicability, for example, with use with an arbiter to control a multi-input asynchronous FIFO usable to synchronize data transfers between asynchronous source and destination clock domains.

20 Claims, 9 Drawing Sheets

(56) References Cited

U.S. PATENT DOCUMENTS

| | | | | |
|---|---|---|---|---|
| 2005/0091429 A1* | 4/2005 | Pande | ................... | G06F 5/10 |
| | | | | 710/52 |
| 2008/0013386 A1* | 1/2008 | Condorelli | ............... | G06F 5/14 |
| | | | | 365/189.07 |
| 2012/0151243 A1* | 6/2012 | Ono | ..................... | G06F 5/12 |
| | | | | 713/400 |
| 2014/0184268 A1* | 7/2014 | Alfieri | ............... | H03K 19/0008 |
| | | | | 326/46 |

OTHER PUBLICATIONS

'Crossing clock domains with an Asynchronous FIFO' by ZipCPU Gisselquist Technology, LLC, Jul. 6, 2018. (Year: 2018).*

'Incrementing Gray Codes' from stack exchange, 2018. (Year: 2018).*

* cited by examiner

| Current count | Current Count - Gray | Gray Count +3 | Number of bits changed |
|---|---|---|---|
| 0 | 0000 | 0010 | 1 |
| 1 | 0001 | 0110 | 3 |
| 2 | 0011 | 0111 | 1 |
| 3 | 0010 | 0101 | 3 |
| 4 | 0110 | 0100 | 1 |
| 5 | 0111 | 1100 | 3 |
| 6 | 0101 | 1101 | 1 |
| 7 | 0100 | 1111 | 3 |
| 8 | 1100 | 1110 | 1 |
| 9 | 1101 | 1010 | 3 |
| 10 | 1111 | 1011 | 1 |
| 11 | 1110 | 1001 | 3 |
| 12 | 1010 | 1000 | 1 |
| 13 | 1011 | 0000 | 3 |
| 14 | 1001 | 0001 | 1 |
| 15 | 1000 | 0011 | 3 |

FIG. 4

| | Count | Gray Code | Bit diverged | Altered Gray Code | Altered Count | Divergence |
|---|---|---|---|---|---|---|
| 2 | 0 | 00000 | 0 | 00001 | 1 | 1 |
| 3 | 0 | 00000 | 1 | 00010 | 3 | 3 |
| 4 | 0 | 00000 | 2 | 00100 | 7 | 7 |
| 5 | 0 | 00000 | 3 | 01000 | 15 | 15 |
| 6 | 0 | 00000 | 4 | 10000 | 31 | 31 |
| 7 | 1 | 00001 | 0 | 00000 | 0 | 31 |
| 8 | 1 | 00001 | 1 | 00011 | 2 | 1 |
| 9 | 1 | 00001 | 2 | 00101 | 6 | 5 |
| 10 | 1 | 00001 | 3 | 01001 | 14 | 13 |
| 11 | 1 | 00001 | 4 | 10001 | 30 | 29 |
| 12 | 2 | 00011 | 0 | 00010 | 3 | 1 |
| 13 | 2 | 00011 | 1 | 00001 | 1 | 31 |
| 14 | 2 | 00011 | 2 | 00111 | 5 | 3 |
| 15 | 2 | 00011 | 3 | 01011 | 13 | 11 |
| 16 | 2 | 00011 | 4 | 10011 | 29 | 27 |
| 17 | 3 | 00010 | 0 | 00011 | 2 | 31 |
| 18 | 3 | 00010 | 1 | 00000 | 0 | 29 |
| 19 | 3 | 00010 | 2 | 00110 | 4 | 1 |
| 20 | 3 | 00010 | 3 | 01010 | 12 | 9 |
| 21 | 3 | 00010 | 4 | 10010 | 28 | 25 |
| 22 | 4 | 00110 | 0 | 00111 | 5 | 1 |
| 23 | 4 | 00110 | 1 | 00100 | 7 | 3 |
| 24 | 4 | 00110 | 2 | 00010 | 3 | 31 |
| 25 | 4 | 00110 | 3 | 01110 | 11 | 7 |
| 26 | 4 | 00110 | 4 | 10110 | 27 | 23 |
| 27 | 5 | 00111 | 0 | 00110 | 4 | 31 |
| 28 | 5 | 00111 | 1 | 00101 | 6 | 1 |
| 29 | 5 | 00111 | 2 | 00011 | 2 | 29 |
| 30 | 5 | 00111 | 3 | 01111 | 10 | 5 |
| 31 | 5 | 00111 | 4 | 10111 | 26 | 21 |
| 32 | 6 | 00101 | 0 | 00100 | 7 | 1 |
| 33 | 6 | 00101 | 1 | 00111 | 5 | 31 |
| 34 | 6 | 00101 | 2 | 00001 | 1 | 27 |
| 35 | 6 | 00101 | 3 | 01101 | 9 | 3 |
| 36 | 6 | 00101 | 4 | 10101 | 25 | 19 |
| 37 | 7 | 00100 | 0 | 00101 | 6 | 31 |
| 38 | 7 | 00100 | 1 | 00110 | 4 | 29 |
| 39 | 7 | 00100 | 2 | 00000 | 0 | 25 |
| 40 | 7 | 00100 | 3 | 01100 | 8 | 1 |
| 41 | 7 | 00100 | 4 | 10100 | 24 | 17 |
| 42 | 8 | 01100 | 0 | 01101 | 9 | 1 |
| 43 | 8 | 01100 | 1 | 01110 | 11 | 3 |
| 44 | 8 | 01100 | 2 | 01000 | 15 | 7 |
| 45 | 8 | 01100 | 3 | 00100 | 7 | 31 |
| 46 | 8 | 01100 | 4 | 11100 | 23 | 15 |
| 47 | 9 | 01101 | 0 | 01100 | 8 | 31 |
| 48 | 9 | 01101 | 1 | 01111 | 10 | 1 |
| 49 | 9 | 01101 | 2 | 01001 | 14 | 5 |
| 50 | 9 | 01101 | 3 | 00101 | 6 | 29 |

FIG. 5

GRAY CODE COUNTER ENABLED TO INCREMENT BY GREATER THAN ONE

TECHNICAL FIELD

The present disclosure relates to systems with multiple interconnected asynchronous clock domains. More particularly the present disclosure relates to FIFO and arbiter techniques for passing multiple sources of data between clock domains operating at different clock frequencies.

BACKGROUND

Complex systems can include multiple different clocks on which various components operate. For example, some systems can have multiple interconnected asynchronous clock domains that pass information between the asynchronous clock domains. Passing information between multiple asynchronous clock domains can bring about complications.

SUMMARY

Asynchronous FIFO systems architectures can provide multiple sources with the same format of information so that a single selected signal can be passed across clock domains to a destination. In such an asynchronous FIFO system, an arbiter-controlled FIFO receives multiple sources and selects which source to provide across a clock domain to the destination. The arbiter can provide a count for controlling which source to provide using a Gray code counter for providing incremental count values.

Implementations described herein include a circuit including a first in first out (FIFO) synchronizing circuit for synchronizing the multiple inputs driven by a source clock to a single output driven by a destination clock, and an arbiter including a Gray code counter for controlling the FIFO synchronizing circuit to arbitrate provision of the multiple inputs to the single output, wherein the Gray code counter is enabled to increment or decrement a Gray code count by one by one for each Gray code count and increments the Gray code count by an additional odd number greater than one for some increments of the Gray code count.

Various implementations provide further features for the Gray code count in the Gray code counters. In some implementations, the Gray code counter is enabled to limit an increment amount dependent on a number of bits in the Gray code counter and a current value of the Gray code count. In some implementations, the Gray code counter is enabled, in a course of advancing, to change only one binary bit in the Gray code counter. In some implementations, the Gray code count is incremented by three for half of possible count values. In some implementations, the Gray code count is incremented by five or seven for a quarter of possible count values.

In various implementations, the Gray code counter is provided in a Gray code register of the arbiter and the Gray code counter is used to generate and provide the write pointer signals. A FIFO synchronizing circuit receives the write pointer signals that are used to convert multiple data word inputs as clocked by the source clock to one or more outputs clocked by the destination clock. In some implementations, the source clock is a different frequency than the destination clock.

In various implementations, the arbiter includes a write pointer counter that uses a value from the Gray code counter to generate write pointer signals that include a first write pointer value and a second write pointer value. The first write pointer value is used for selecting one input of multiple inputs of a source multiplexer. The second write pointer value is used for providing to storage elements. In some implementations, the arbiter is enabled to calculate a number of counts that cannot be added to the first write pointer value due to disallowed new write pointer values. In some implementations, the write pointer signals further include a third write pointer value, wherein the third write pointer value is provided to one or more metastable filters and is limited in amounts of value advancement due to the disallowed new write pointer values. An output of the metastable filter can be used to provide an indication of a full state of the FIFO synchronizing circuit. In some implementations, the write pointer values can be provided to a shared write pointer that can provide the write pointer values together.

In various implementations, the arbiter further includes a count accumulator provided in the write pointer counter. The number of counts that are skipped in a write pointer value are added to the count accumulator, so that the count accumulator keeps a running total of the skipped counts. The count accumulator is accessed by the write point counter to determine a total of previously missed actions and to calculate the third write pointer value based on the total of previously missed actions to eliminate a count difference between the first write pointer value and the second write pointer value.

In some implementations, some of the multiple inputs are written simultaneously, and one of the multiple inputs, based on a priority numbering of the multiple inputs, receives a highest priority for transfer when two of the multiple inputs arrive simultaneously.

Various implementations further provide a method for operating a Gray code counter. The method includes incrementing or decrementing a Gray code count by one, and incrementing the Gray code count by an additional odd number greater than one for some increments of the Gray code count. In some implementations, the Gray code counter is provided in a Gray code register of an arbiter and the Gray code counter is used to generate and provide write pointer signals, and a FIFO synchronizing circuit receives the write pointer signals that are used to convert multiple data word inputs as clocked by a source clock to one or more outputs clocked by a destination clock. In some implementations, the arbiter includes a write pointer counter that uses a value from the Gray code counter to generate the write pointer signals that include a first write pointer value and a second write pointer value, the first write pointer value is used for selecting one input of multiple inputs of a source multiplexer, and the second write pointer value is used for providing to storage elements. In some implementations, the Gray code count is advanced by only one binary bit in a number of bits in the Gray code counter. In some implementations, the Gray code count is incremented by three for half of possible counts.

A further implementation includes a method of operating a circuit for providing multiple inputs to a single output. The method can include synchronizing the multiple inputs driven by a source clock to a single output driven by a destination clock, implementing an arbiter including a Gray code counter to control the synchronizing to arbitrate provision of the multiple inputs to the single output, and implementing the Gray code counter to increment or decrement a Gray code count by one, and incrementing the Gray code count by an additional number greater than one for some increments of the Gray code count.

Various implementations further provide a non-transitory computer readable medium comprising stored instructions for providing multiple inputs to a single output, the stored instructions, the store instructions, when executed by a processor, causing the processor to perform certain operations. The operations include synchronizing the multiple inputs driving by a source clock to a single output driven by a destination clock, implementing an arbiter including a Gray code counter to control the synchronizing to arbitrate provision of the multiple inputs to the single output, and implementing the Gray code counter to increment or decrement a Gray code count by one, and incrementing the Gray code count by an additional odd number greater than one for some increments of the Gray code count. In some implementations, the operations further include changing one binary bit in a number of bits in the Gray code counter in a course of advancing the Gray code count and incrementing the Gray code count by three for half of possible counts.

BRIEF DESCRIPTION OF THE DRAWINGS

The disclosure will be understood more fully from the detailed description given below and from the accompanying figures of techniques of the disclosure. The figures are used to provide knowledge and understanding of techniques of the disclosure and do not limit the scope of the disclosure to these specific techniques. Furthermore, the figures are not necessarily drawn to scale.

FIG. 4 is a table showing current count values, a corresponding Gray code for the current count and the Gray code incremented by 3.

FIG. 5 is a table showing pointer values with a current count, a corresponding Gray code and an altered Gray code illustrating that the Gray code can be incremented by 3 or more.

DETAILED DESCRIPTION

Figure 1:
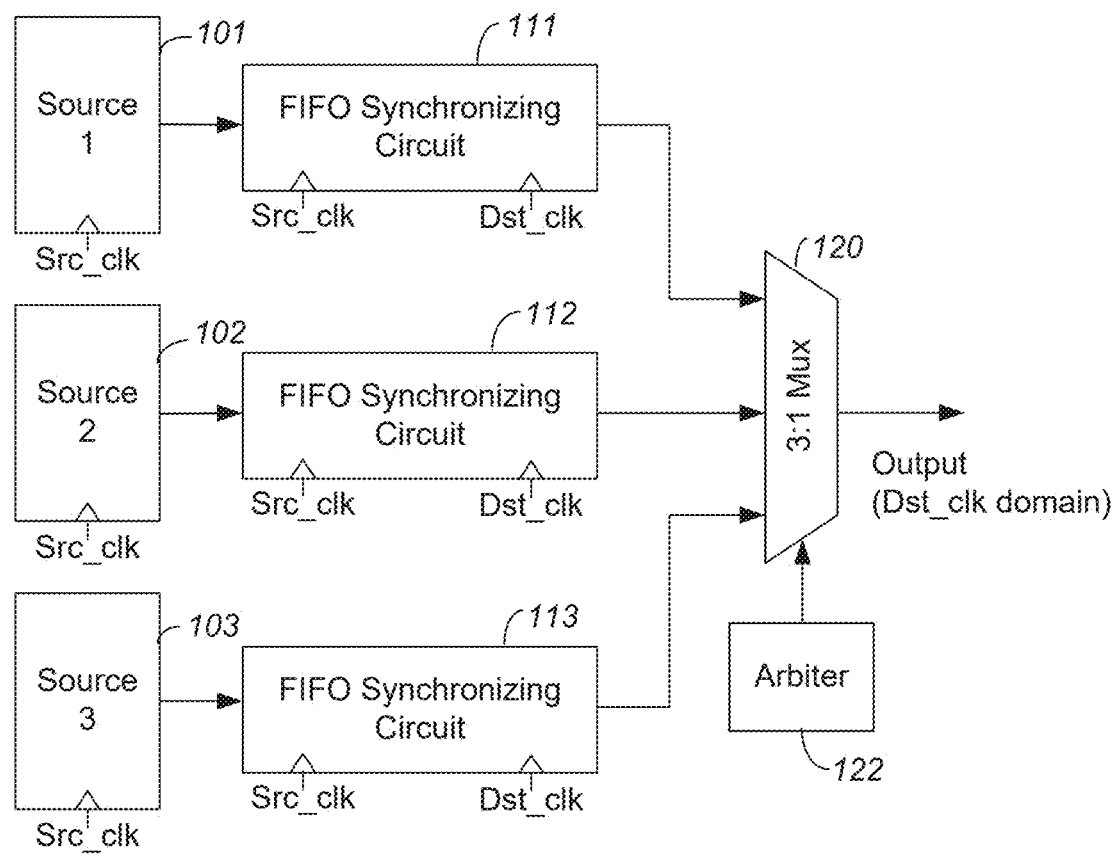
FIG. 1 is a block diagram illustrating a multiple-FIFO architecture.

Aspects of the present disclosure relate to a Gray code counter enabled to increment by values greater than one, usable, e.g., for a multi-input asynchronous FIFO arbiter. The multi-input asynchronous FIFO arbiter is usable to communicate information from a source clock domain to a destination clock domain. The source and destination clock domains operate at respective frequencies, such as the source clock domain operating at a lower frequency than the destination clock domain or alternatively the source clock domain operating at a higher frequency than the destination clock domain. In the figures, the source clock domain is labeled as "Src_clk" and the destination clock domain is labeled as "Dst_clk".

The Gray code, also known as reflected binary code is an ordering of the binary numeral system such that two successive values differ in only one bit (or binary digit). For example, the representation of the decimal value "1" in binary would normally be "001" and "2" would be "010". In Gray code these values are represented as "001" and "011". That way, incrementing a value from 1 to 2 requires only one bit to change instead of two. Gray codes are used to prevent spurious output from electrical control systems, such as an arbiter that controls data flow between the input and output of a FIFO or such as a controller for electrical switches. The use of Gray code in the arbiter for a FIFO or in a controller for electrical switches helps simplify logic operations and reduce errors in practice.

Techniques described herein are usable in situations where multiple sources of data (e.g., same-format data) in a source clock domain are provided concurrently to a single data path in a destination clock domain. Synchronization errors (e.g., lost data and/or incorrect read/write FIFO pointers) are possible with multiple sources providing data at unpredictable times, such as asynchronously with respect to the destination clock domain.

Techniques described herein include a Gray code counter enabled to increment by values greater than one when used in an arbiter of a FIFO. For all count values, the Gray code counter can increment by one, with only a single bit changing. For some count values, the Gray code counter can increment by more than one, with only a single bit changing.

Several different FIFO system configurations are usable to deliver source data in a source clock domain to a destination clock domain. A first FIFO system uses multiple FIFO synchronization circuits each providing one of the source inputs to a multiplexer controlled by an arbiter to provide a single output. This first system provides a high bandwidth, low latency circuit, but that has a significant amount of circuitry. A second FIFO system uses a single FIFO synchronization circuit to receive the multiple source signals and provide a single output. This second FIFO system uses significantly less circuitry than the first system, but comparatively provides a low bandwidth and high latency. The low bandwidth can result in increased backpressure.

A third FIFO system uses a single FIFO synchronization circuit to receive the multiple source signals and provide a single output. Compared to the second FIFO system, the third FIFO system results in less backpressure. The third FIFO system provides high bandwidth and low latency while being less silicon intensive than the second FIFO system. If the clock ratio between the source clock domain to the destination clock domain is at least 3:1, and there are three inputs to the FIFO synchronizing circuit from three source data inputs, then source and output sides can run at full bandwidth 100% of the time. This is enabled by Gray code write pointers (in the arbiter controlling the multiplexer selection) that are enabled to increment by more than one while changing a single bit at a time.

FIG. 1 is a block diagram illustrating a multiple-FIFO architecture that includes separate data input sources 101-103 operating in a source clock domain that provide data to multiple FIFO synchronizing circuits 111-113 that distribute the source data in a destination clock domain to a multiplexer 120 with arbiter 122 that provides the source data on a single output in the destination clock domain. The architecture of FIG. 1 is an example of the first FIFO system that provides high bandwidth and low latency. The multiple FIFO synchronizing circuits 111-113 enable high bandwidth and low latency at the expense of a significant amount of circuitry.

Figure 2:
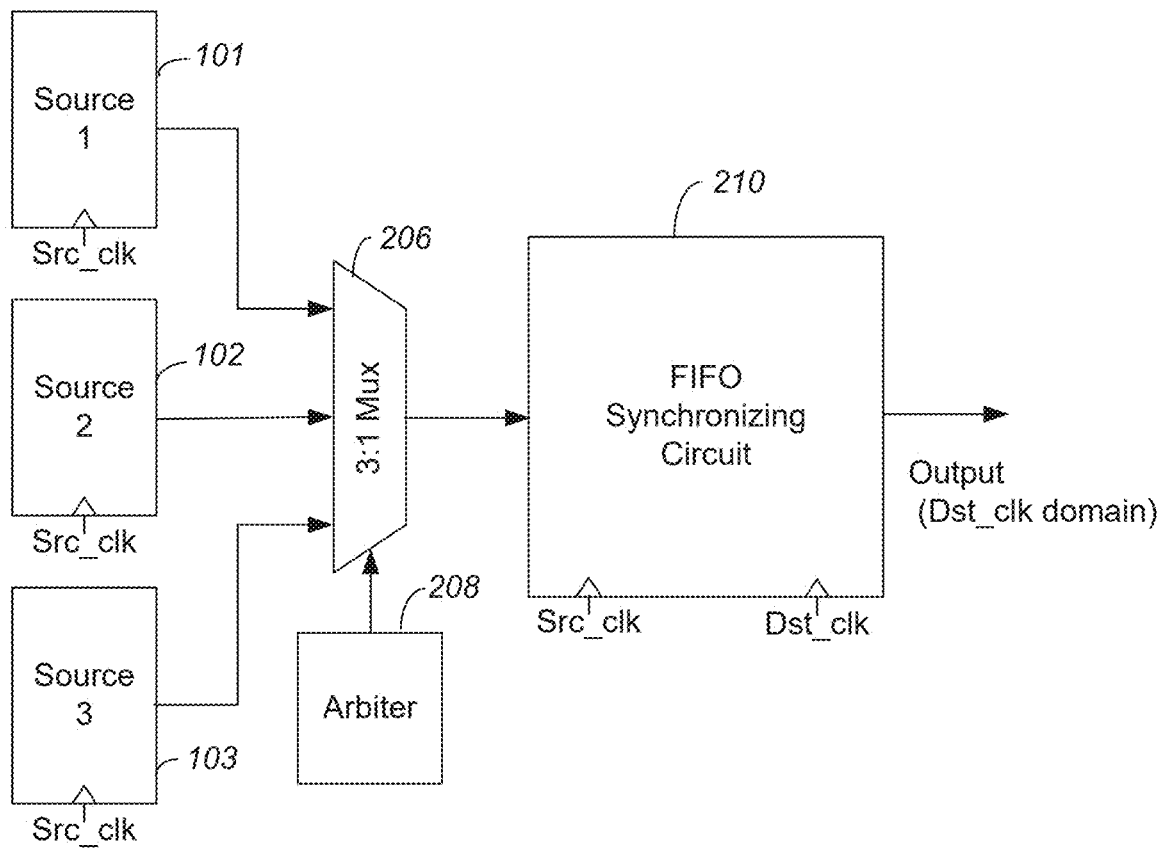
FIG. 2 is a block diagram illustrating a single-FIFO architecture.

FIG. 2 is a block diagram illustrating a single-FIFO architecture that includes separate data input sources 101-103 operating in a source clock domain that provide data to a multiplexer 206 and arbiter 208 that selectively provide a single output to the FIFO synchronizing circuit 210 that converts the source data from the source clock domain to a destination clock domain. For convenience, the data input sources 101-103 carried over from FIG. 1 to subsequent figures are similarly labeled. The multiplexer 206 with an arbiter 208 are used to receive the data source 101-103 inputs in the source clock domain and provide a single data output in the source clock domain to the FIFO synchronizing circuit 210. The FIFO synchronizing circuit 210 then converts the source data from the source clock domain to the destination clock domain. The data input sources 101-103 in FIG. 3 must support backpressure for cases when data inputs from data input sources 101-103 arrive together (e.g., within a same cycle of the source clock) and the arbiter 208 selects a single one of the sources that arrive together. Any unselected source is sent backpressure. The architecture of FIG. 2 is an example of the second FIFO system that provides low bandwidth and high latency at the advantage of a small amount of circuitry.

Figure 3:
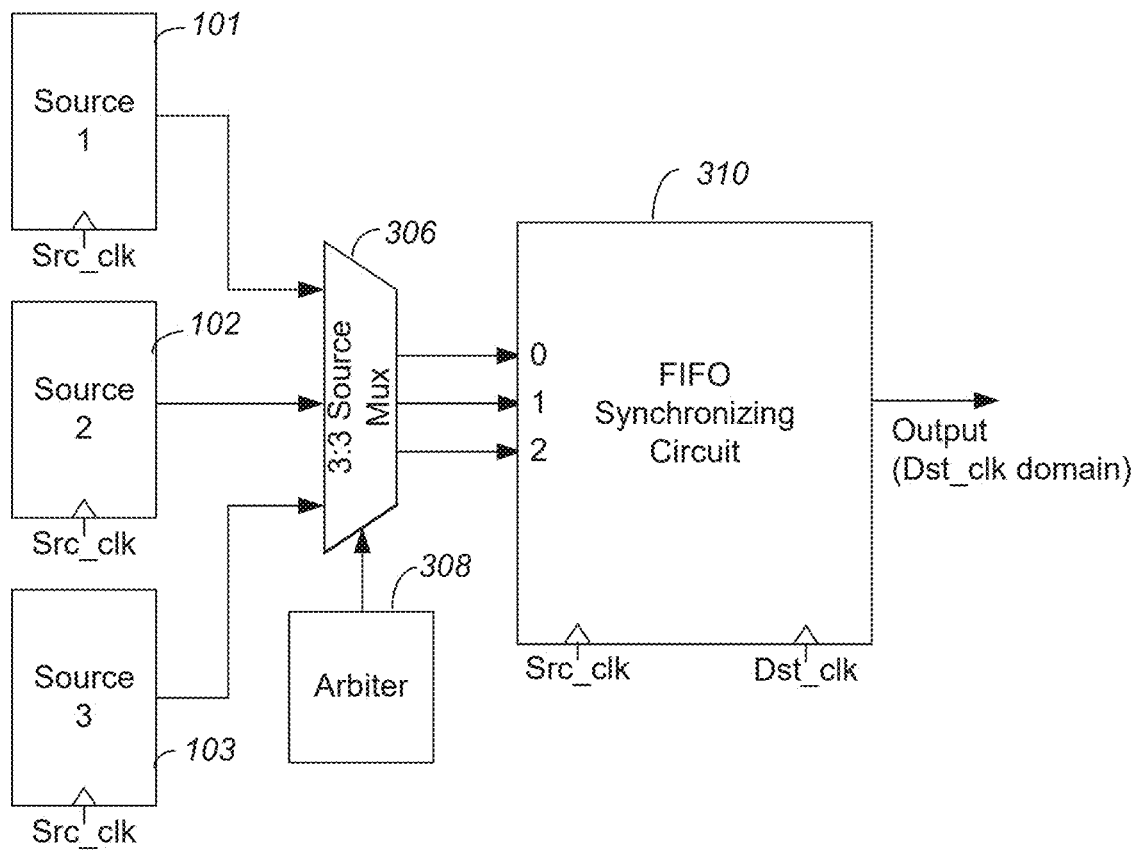
FIG. 3 is a block diagram illustrating a variation of the single-FIFO architecture of FIG. 2.

FIG. 3 is a block diagram illustrating a variation of the single-FIFO architecture of FIG. 2, with a source multiplexer 306 that is a 3:3 multiple output multiplexer (instead of the multiplexer 206, and also known as a crossbar) that provides the multiple outputs to multiple inputs of a single FIFO synchronizing circuit 310. If the ratio of the frequency of the destination clock to the source clock is at least 3:1, then the system of FIG. 3 operates at full bandwidth (e.g., there is no backpressure to any of the sources) even if all three source inputs arrive at the same time (e.g., within a single clock cycle of the source clock domain). If the ratio of the frequency of the destination clock to the source clock is not at least 3:1, then the system may operate at reduced bandwidth (e.g., there is backpressure to at least one of the sources).

FIGS. 4 and 5 illustrate count features for such a Gray code counter that can be used in a FIFO synchronizing circuit 310, such as shown in FIG. 3, that can be used to alleviate backpressure and enable the circuit of FIG. 3 to provide a high bandwidth and low latency system. To enable the Gray code count to alleviate backpressure, the Gray code count can increment or decrement by numbers greater than one. The Gray code counts of FIG. 4 and FIG. 5 illustrate such alternative counts.

FIG. 4 is a table showing current count values, a corresponding Gray code for the current count and the Gray code incremented by 3 ("+3"). The table of FIG. 4 illustrates that half of all Gray code pointer count values can increment by 3 instead of just one, with only a one-bit change to the Gray count. Thus, if three inputs are written at once, then half the time, the write pointer can increment by three immediately, and all three data inputs will be available in a destination clock domain simultaneously.

FIG. 5 is a table showing pointer values with a current count, a corresponding Gray code and an altered Gray code illustrating that the Gray code can be incremented by 3 or more with only a 1-bit change. FIG. 5 illustrates that one-quarter of all Gray code count values can increment by 5 or 7 or even higher values instead of one, with only a one-bit Gray code change. This can be exploited to increase the average bandwidth and reduce the average latency through a FIFO system such as illustrated in FIG. 3.

FIG. 5 provides a partial analysis of the 5-bit Gray Code, and that increment values are allowed for each current count. FIG. 5 only refers to a portion of the possible counts for 5 bits of count value, but any number of bits greater than 2 are feasible for possible counts. For each count value, five altered count values are given, one for each bit being changed. Also included are the sizes of divergence from the current count value associated with each bit being changed. This shows which values of increment magnitude are available for each current count. It also shows the frequency of availability of any particular increment magnitude. As stated, half of all possible current count values can be incremented by three, as seen in the table of FIG. 5. The frequency of the availability of an increment by five or seven (or any other feasible odd number) can also be seen.

Thus, techniques described herein employ use of the Gray code counter driven write pointers that are controlled by a Gray code counter of an arbiter in a FIFO system. The Gray codes enable a write pointer value to be reliably transferred between clock domains. The pointer is either transferred accurately and up-to-date, or the write pointer received in the other clock domain is merely behind by one count (or a fixed number of counts when the Gray count is incremented by more than 1) and the destination multiplexer output will be updated in subsequent clocks to correspond with a source-side write pointer.

A detailed analysis of Gray code values possible using FIGS. 4 and 5 reveals that for half of all possible current count values, an increment of 3 (instead of 1) results in at most one bit changing at a time. Furthermore, for a quarter of all possible current count values, an increment of 5 or 7 results in at most one bit changing at a time. So long as only one bit is ever changing at a time, then after processing by metastable filters (e.g., metastable synchronizers), the output is either up-to-date or behind, but either way is valid, and if behind then it will catch up in the near future.

Figure 6:
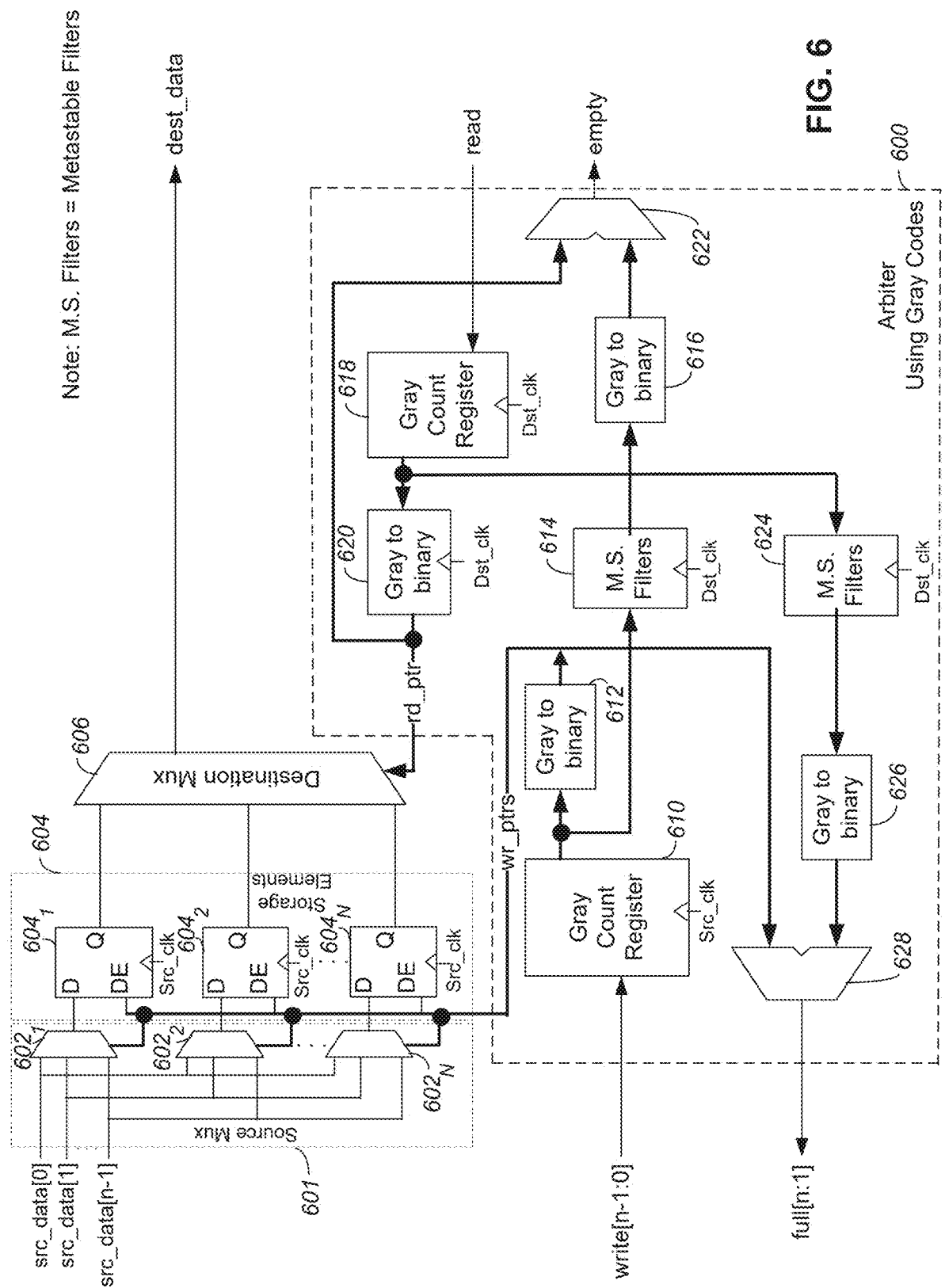
FIG. 6 illustrates selected details of an implementation based on the single-FIFO architecture of FIG. 3.

FIG. 6 illustrates selected details of an implementation based on the single-FIFO architecture of FIG. 3 that uses Gray codes. In FIG. 6, the source multiplexer 601 provides multiple inputs to the FIFO data storage 604. The multiple input sources from the source multiplexer 601 (input sources 101-103 of FIG. 3) correspond to the received source inputs src_data[0]–src_data[n−1] in FIG. 6 and these source inputs are provided to multiplexers $602_1$-$602_N$. An arbiter using Gray codes 600 uses Gray codes provided from a Gray count register 610. The Gray count register 610 receives indicators of data to write (write[n−1:0]) for each of the received source inputs src_data[0]–src_data[n−1]. Write pointer signals (wr_ptrs) are provided from the Gray count register 610 to the select input of the multiplexers $602_1$-$602_N$ after being converted to binary by a Gray count to binary converter 612. The write pointer signals control selection of the outputs of the multiplexers $602_1$-$602_N$ to provide to storage elements $604_1$-$604_N$ (collectively referred to as storage elements 604). The storage elements $604_1$-$604_N$ are later accessed by a destination multiplexer 606 to select and provide a single destination data output (dest_data).

The destination multiplexer 606 has a select control input provided from a Gray count register 618. The Gray count register 618 provides a pointer signal through a Gray to binary converter 620 to provide the read pointer signal (rd_ptr) to control selection of the destination multiplexer 606.

In the arbiter using Gray codes 600, the Gray count register 610 stores a Gray count value that is used to control the write pointer signals. The Gray count register 610 output is provided to the Gray count to binary converter 612 that generates the write pointer signals. The Gray count register 610 output is also provided through one or more metastable filters (M.S. Filters) 614 and through a Gray count to binary converter 616 that provides an output to a multiplexer 622 that provides a signal indicating a full/empty state with respect to receiving destination reads. Similarly, the output of the Gray count register 618 is provided through one or more metastable filters (M.S. Filters) 624 through a Gray to binary converter 626 that provides an output to multiplexer 628 that provides signals indicating a full/empty state with respect to receiving source writes from each of the received source inputs src_data[0]–src_data[n−1].

Components of the arbiter using Gray codes 600 that provide the write pointer signals to the source multiplexer 601 are in the source clock domain, while components of the arbiter using Gray codes 600 that provide the write pointer signals to the destination multiplexer 606 are in the destination clock domain. For instance, components controlling the source multiplexer 601 such as the Gray count register 610 and the storage elements 604 that receive the source multiplexer 601 outputs are in the source clock while the destination multiplexer 606 is driven by elements such as the Gray count register 618 that is in the destination clock domain.

As described above, circuitry is provided in the arbiter using Gray codes 600 to provide FIFO synchronizing circuit full and empty indications. The output of the one or more metastable filters 614 that receives the write Gray count from Gray count register 610 is provided through the Gray count to binary converter 616 to an input of the digital comparator 622 along with the output of the read Gray to binary converter 620 that provides the read Gray count information to the other input of the digital comparator 622. The output of the digital comparator 622 provides a FIFO synchronizing circuit empty indication. Similarly, the Gray count to binary converter 612 is provided to a first input of a digital comparator 628, while a second input of the digital comparator 628 is provided from the read Gray count received from the Gray count register 618 through the one or more metastable filters 624 and Gray to binary converter 626. The output of digital comparator 628 provides a FIFO synchronizing circuit full indication. Optionally, a FIFO synchronizing circuit full indication is provided with multiple bit connections, wherein the FIFO synchronizing circuit full indication indicates when the FIFO synchronizing circuit is too full for some number of simultaneous writes, but not too full for a smaller number of writes. The full indication (e.g., with multiple bit connections) is usable to provide backpressure indication to the provider of the received source inputs src_data[0]–src_data[n−1].

Figure 7A:
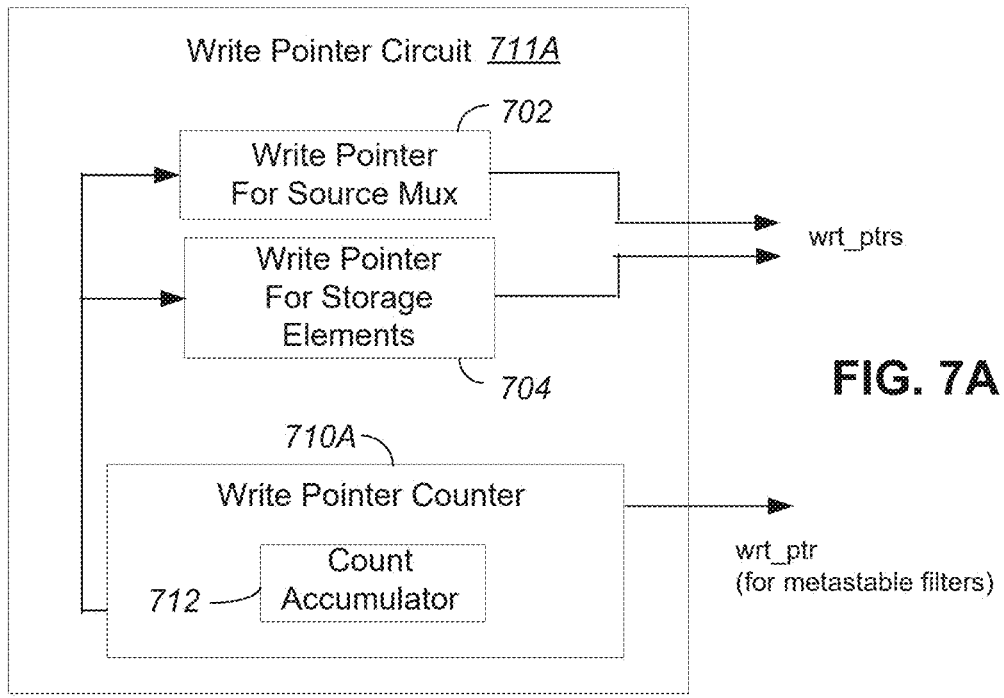
FIG. 7A is a block diagram showing selected details for a first implementation of a write pointer circuit.

FIG. 7A is a block diagram showing selected details for a first implementation of the Gray count register 610 of FIG. 6, shown here as a write pointer circuit 711A. As shown, the write pointer circuit 711A includes a write pointer counter 710A providing count data to a write pointer for source mux 702 and a write pointer for storage elements 704. The write pointer for source mux 702 provides information corresponding to outputs of the Gray count to the binary converter 612 of FIG. 6 for controlling the source multiplexer 601. Thus, the write pointer for source mux 702 controls selection of the outputs of the source multiplexer 601 to provide to the storage elements 604. The write pointer for storage elements 704 provides information corresponding to outputs of the Gray count to binary converter 612 for controlling the storage elements 604 to selectively store one of more of the outputs from the source multiplexer 601.

The write pointer counter 710A provides count data to the one or more metastable filters 614 of FIG. 6. The count data corresponds to an accumulated number of additions to write pointers and is transmitted to the destination clock domain such that FIFO empty states can be properly calculated. This is where it is important that only one or zero bits ever changes at a time.

While the FIFO synchronizing circuit of FIG. 6 is enabled to operate with Gray count increments of more than one, not all write pointer values (wrt_ptrs) to the metastable filters are allowed at all times. Therefore, updates to the metastable filters 614 are prevented from exceeding an increment value that is beyond the Gray count limits that could cause a source input to be missed entirely. Accordingly, the write pointer counter 710A includes a count accumulator 712 that is used by arbitration logic within the write pointer counter 710A to control the write pointer for source mux 702 and the write pointer for storage elements 704 separately from that for metastable filters 614. The arbitration logic of the write pointer counter 710A needs to know ahead of time which new pointer values are allowed for the given current count for the write pointer for source mux 702. The arbitration logic in the write pointer counter 710A thus calculates two things: 1, the new count value (that is allowed as a new count value), and 2, the number of counts that cannot be added to the new pointer at this time due to disallowed new values. The number of counts that can be added is stored in the count accumulator 712. The count accumulator 712 keeps a running total of missed additions. At all times, calculation of new values for the write pointer for source mux 702 and the write pointer for storage elements 704 using the write pointer counter 710A accounts for accumulated missed or skipped additions. For example, if there is one new write to the FIFO synchronizing circuit, the count accumulator 712 has a current value of two, and the current count allows for incrementing by three, then a new write pointer generated by the write pointer counter 710A will then make the new write pointer three higher, and the count accumulator 712 afterward will go back to zero.

Optionally, the write pointer for source mux 702 provides separate identifications for each of the storage elements $604_1$-$604_N$ that are to be written, as there is a need for as many write pointers as there are data inputs, since a maximum of up to all input data words are allowed to be written simultaneously. Thus, there is a unique storage write pointer for each.

Provisions are made for deciding which input data word goes into the FIFO synchronizing circuit "ahead of" the others, in the case of multiple simultaneous active input words. "Ahead of" refers to which of the multiple inputs will show up at the single output first. Some implementations use a fixed priority ordering scheme that the arbitration logic of the write pointer counter 710A implements. For example, the active input that is numbered closest to zero is the highest priority, the next closest to zero is the next highest priority, and so on.

Figure 7B:
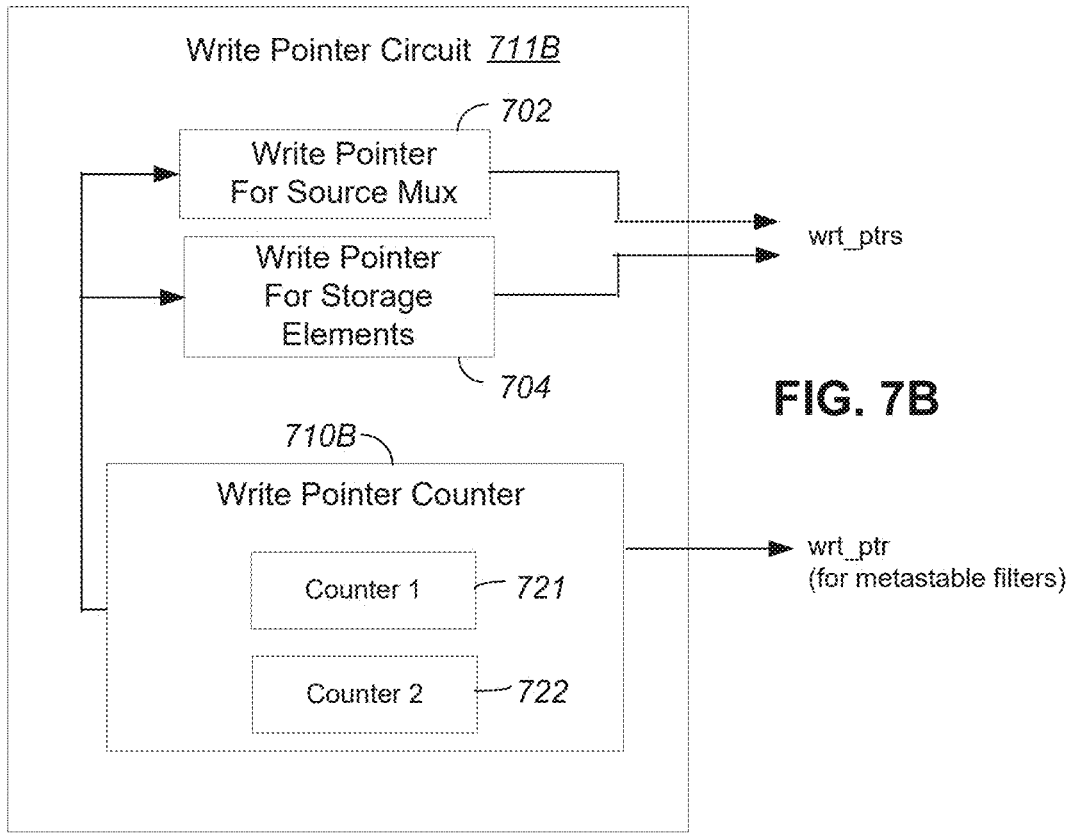
FIG. 7B is a block diagram showing selected details for a second implementation of a write pointer circuit.

FIG. 7B is a block diagram showing selected details for a second implementation of the Gray count register 610 of FIG. 6, shown in FIG. 7 as a write pointer circuit 711B. Compared to the write pointer counter 710A of FIG. 7A, a write pointer counter 710B of FIG. 7B has a pair of write counters (counter 1 721 and counter 2 722) instead of a count accumulator (count accumulator 712).

The counter 1 721 provides a write pointer to the storage elements $604_1$-$604_N$ to be written and to the input multiplexors 602. The counter 2 722 provides a write pointer to the metastable filters 614. The counter 1 721 and the counter 2 722 have values that can diverge to the limits of how much the counter 2 722 is allowed to be incremented in one clock.

For some implementations disclosed herein, the source clock is a lower frequency than the destination clock. For some implementations disclosed herein, the source clock is a higher frequency than the destination clock. Thus, implementations disclosed herein can be adapted for any relative clock frequency differences between the source clock domain and the destination clock domain. As an alternative to varying the clock frequency, the clock phase can also be varied between the source clock and destination clock in embodiments described herein.

Figure 8:
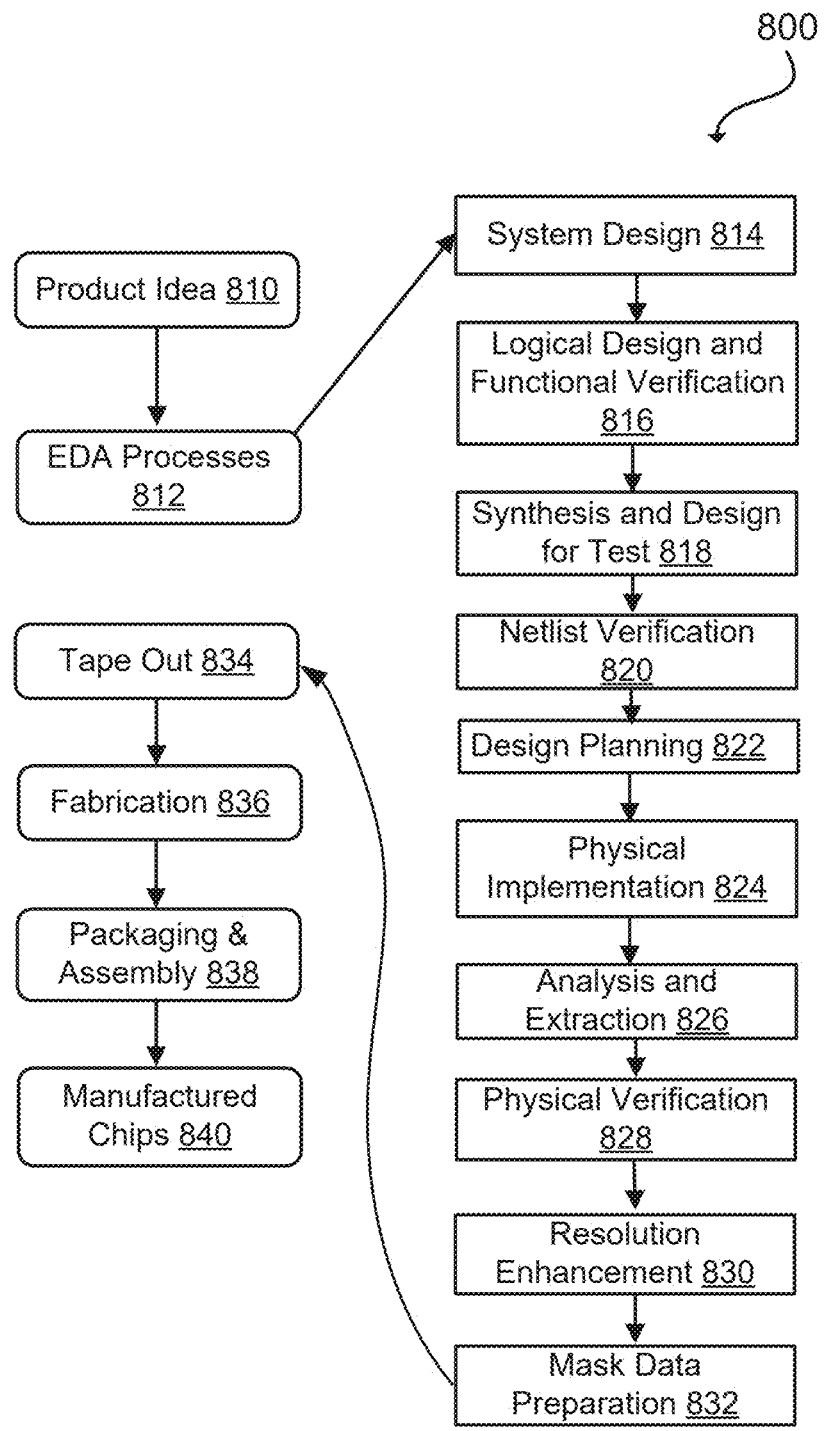
FIG. 8 depicts a flowchart of various processes used during the design and manufacture of an integrated circuit in accordance with some embodiments of the present disclosure.

FIG. 8 illustrates an example set of processes 800 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 810 with information supplied by a designer, information which is transformed to create an article of manufacture that uses a set of EDA processes 812. When the design is finalized, the design is taped-out 834, which is when artwork (e.g., geometric patterns) for the integrated circuit is sent to a fabrication facility to manufacture the mask set, which is then used to manufacture the integrated circuit. After tape-out, a semiconductor die is fabricated 836 and packaging and assembly processes 838 are performed to produce the finished integrated circuit 840.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 8. The processes described by be enabled by EDA products (or EDA systems).

During system design 814, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 816, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 818, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 820, the netlist is checked for compliance with timing constraints and for correspondence with the HDL code. During design planning 822, an overall floor plan for the integrated circuit is constructed and analyzed for timing and top-level routing.

During layout or physical implementation 824, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 826, the circuit function is verified at the layout level, which permits refinement of the layout design. During physical verification 828, the layout design is checked to ensure that manufacturing constraints are correct, such as DRC constraints, electrical constraints, lithographic constraints, and that circuitry function matches the HDL design specification. During resolution enhancement 830, the geometry of the layout is transformed to improve how the circuit design is manufactured.

During tape-out, data is created to be used (after lithographic enhancements are applied if appropriate) for production of lithography masks. During mask data preparation 832, the 'tape-out' data is used to produce lithography masks that are used to produce finished integrated circuits.

A storage subsystem of a computer system (such as computer system 900 of FIG. 9) may be used to store the programs and data structures that are used by some or all of the EDA products described herein, and products used for development of cells for the library and for physical and logical design that use the library.

Figure 9:
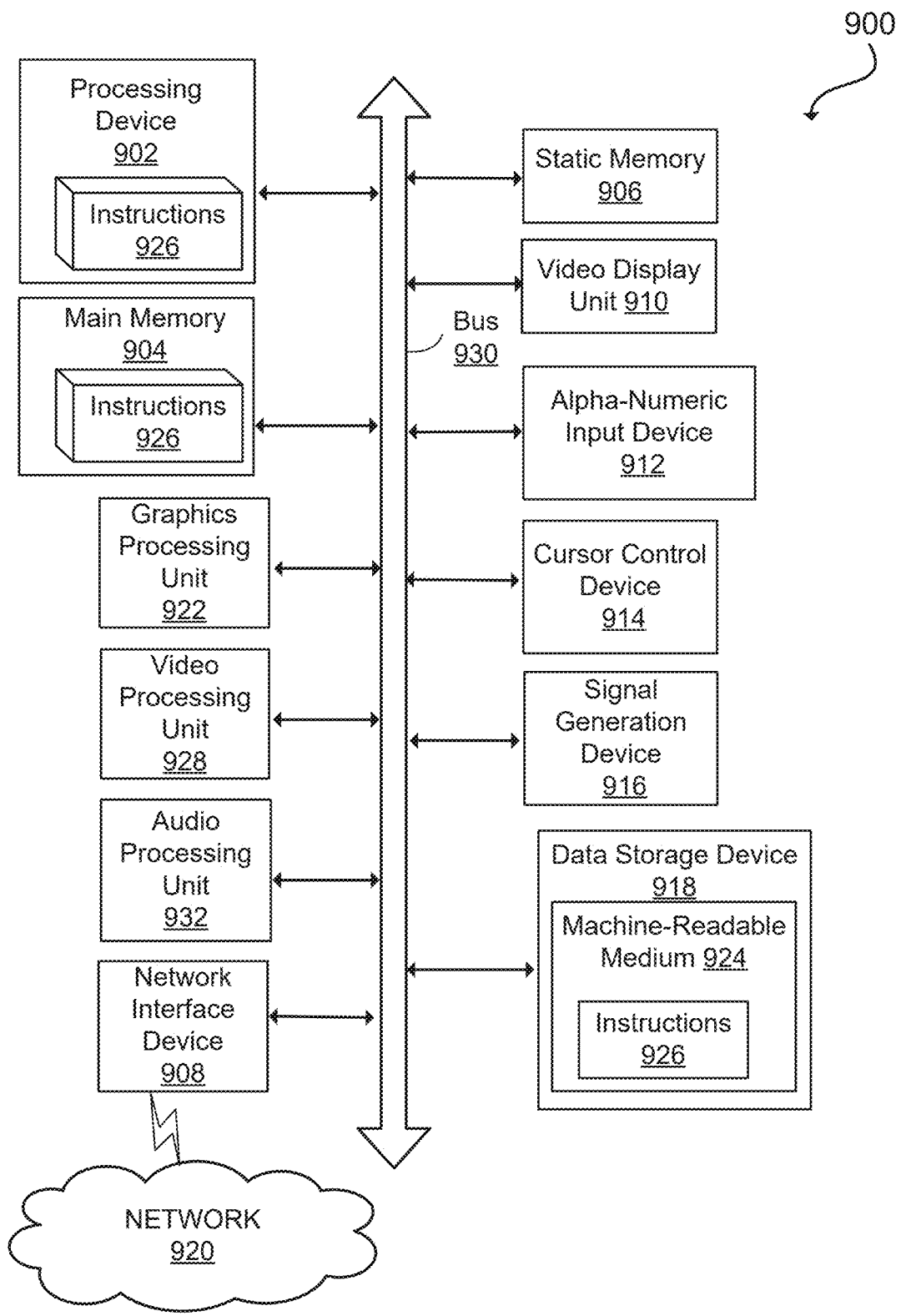
FIG. 9 depicts a diagram of an example computer system in which embodiments of the present disclosure may operate.

FIG. 9 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, which may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A circuit for providing multiple inputs to a single output, the circuit comprising:
 a first in first out (FIFO) synchronizing circuit for synchronizing the multiple inputs driven by a source clock to a single output driven by a destination clock; and
 an arbiter including a Gray code counter for controlling the FIFO synchronizing circuit to arbitrate provision of the multiple inputs to the single output, wherein the Gray code counter is enabled to:
  increment or decrement a Gray code count by one, and
  increment the Gray code count by an additional number greater than one for some increments of the Gray code count,
 wherein the Gray code count is used to generate write pointer signals that include a first write pointer value and a second write pointer value,
 wherein the first write pointer value is used for selecting one or more outputs of multiple outputs of a source multiplexer, and
 wherein the second write pointer value is used for selecting one or more storage elements to store one or more of the selected outputs of the source multiplexer.

2. The circuit of claim 1,
 wherein the Gray code counter is enabled to limit an increment amount for the Gray code count dependent on a number of bits in the Gray code counter and a current value of the Gray code count.

3. The circuit of claim 2,
 wherein the Gray code counter is enabled, in a course of advancing, to change only one binary bit in the Gray code counter.

4. The circuit of claim 1,
 wherein the Gray code count is provided in a Gray code register of the arbiter, and
 wherein the FIFO synchronizing circuit receives the write pointer signals that are used to convert multiple data word inputs as clocked by the source clock to one or more outputs clocked by the destination clock.

5. The circuit of claim 4, wherein the source clock is a different frequency than the destination clock.

6. The circuit of claim 4 wherein the source clock is a different phase than the destination clock.

7. The circuit of claim 4, wherein the arbiter includes:
 a write pointer counter that uses a value from the Gray code counter to generate the write pointer signals that are provided as a shared write pointer,
 wherein the shared write pointer is used for both selecting one or more outputs of multiple outputs of a source multiplexer and for selecting one or more storage elements to store one or more of the selected outputs of the source multiplexer.

8. The circuit of claim 4, wherein the arbiter includes:
 a write pointer counter that uses a value from the Gray code counter to generate the write pointer signals that include the first write pointer value and the second write pointer value.

9. The circuit of claim 8,
 wherein the write pointer signals further include a third write pointer value, and
 wherein the third write pointer value is provided to one or more metastable filters and is limited in amounts of value advancement due to disallowed new write pointer values.

10. The circuit of claim 9, wherein the arbiter:
 is enabled to calculate a number of counts that cannot be added to the first write pointer value due to the disallowed new write pointer values, and
 is enabled to calculate the third write pointer value as a pointer value for the destination clock via the one or more metastable filters based on the disallowed new write pointer values.

11. The circuit of claim 10, wherein the arbiter further includes:
 a count accumulator provided in the write pointer counter,
 wherein a number of counts that are skipped in the third write pointer value are added to the count accumulator, so that the count accumulator keeps a running total of the skipped counts, and
 wherein the count accumulator is accessed by the write point counter to determine a total of previously missed actions and to calculate the third write pointer value based on the total of previously missed actions to eliminate a count difference between the first write pointer value and the second write pointer value.

12. The circuit of claim 1,
 wherein some of the multiple inputs are written simultaneously, and
 wherein one of the multiple inputs, based on a priority numbering of the multiple inputs, receives a highest priority for transfer when two of the multiple inputs arrive simultaneously.

13. The circuit of claim 8,
 wherein the arbiter further includes metastable filters connected to the Gray code register to receive an output from the Gray code counter, and
 wherein an output of the metastable filters is used to provide an indication of a full and/or empty state or inversions thereof of the FIFO synchronizing circuit.

14. A method of operating a circuit for providing multiple inputs to a single output, the method comprising:
 synchronizing the multiple inputs driving by a source clock to a single output driven by a destination clock;
 implementing an arbiter including a Gray code counter to control the synchronizing to arbitrate provision of the multiple inputs to the single output; and
 implementing the Gray code counter to:
  increment or decrement a Gray code count by one, and
  increment the Gray code count by an additional number greater than one for some increments of the Gray code count, and
 wherein the Gray code count is used to generate write pointer signals that include a first write pointer value and a second write pointer value, and
 wherein the method includes:
  implementing the first write pointer value to select one or more outputs of multiple outputs of a source multiplexer, and implementing the second write pointer value to select one or more storage elements to store one or more of the selected outputs of the source multiplexer.

15. The method of claim 14,
wherein the Gray code counter is provided in a Gray code register of the arbiter, and
wherein a FIFO synchronizing circuit receives the write pointer signals that are used to convert multiple data word inputs as clocked by the source clock to one or more outputs clocked by the destination clock.

16. The method of claim 15, wherein the arbiter includes:
a write pointer counter that uses a value from the Gray code counter to generate the write pointer signals that include the first write pointer value and the second write pointer value.

17. The method of claim 14, wherein the Gray code count is advanced by only one binary bit in a number of bits in the Gray code counter.

18. The method of claim 14, wherein the source clock is a different frequency than the destination clock.

19. A non-transitory computer readable medium comprising stored instructions for providing multiple inputs to a single output, the stored instructions, when executed by a processor, causing the processor to:
synchronize the multiple inputs driving by a source clock to a single output driven by a destination clock;
implement an arbiter including a Gray code counter to control the synchronizing to arbitrate provision of the multiple inputs to the single output; and
implement the Gray code counter to:
increment or decrement a Gray code count by one, and
increment the Gray code count by an additional number greater than one for some increments of the Gray code count,
wherein the Gray code count is used to generate a shared write pointer, and
wherein the instructions, when executed by the processor, cause the processor to implement the shared write pointer to both select one or more outputs of multiple outputs of a source multiplexer and to select one or more storage elements to store one or more of the selected outputs of the source multiplexer.

20. The non-transitory computer readable medium of claim 19, wherein the stored instructions further cause the processor to:
change one binary bit in a number of bits in the Gray code counter in a course of advancing the Gray code count.

* * * * *